(12) United States Patent
Vassallo et al.

(10) Patent No.: US 6,763,041 B1
(45) Date of Patent: Jul. 13, 2004

(54) METHOD AND APPARATUS FOR A J2 INTERFACE

(75) Inventors: Michael Vassallo, Redwood City, CA (US); Michael Skerritt, Herndon, VA (US)

(73) Assignee: Network Equipment Technologies, Inc., Fremont, CA (US)

( * ) Notice: Subject to any disclaimer, the term of this patent is extended or adjusted under 35 U.S.C. 154(b) by 801 days.

(21) Appl. No.: 09/595,813

(22) Filed: Jun. 16, 2000

(51) Int. Cl.[7] .................................................. H04J 3/00
(52) U.S. Cl. ...................................... 370/535; 370/465
(58) Field of Search ................................ 370/248, 465, 370/466, 533, 535, 359, 537, 538, 539, 540, 216, 217

(56) References Cited

U.S. PATENT DOCUMENTS

| | | | | |
|---|---|---|---|---|
| 5,764,628 A | * | 6/1998 | Davis et al. ................ | 370/271 |
| 5,878,044 A | * | 3/1999 | Frischknecht et al. ...... | 370/466 |
| 6,636,478 B1 | * | 10/2003 | Sensel et al. ............... | 370/216 |
| 6,639,894 B1 | * | 10/2003 | Sensel et al. ............... | 370/217 |
| 6,647,028 B1 | * | 11/2003 | Lancon et al. .............. | 370/535 |

* cited by examiner

*Primary Examiner*—Melvin Marcelo
*Assistant Examiner*—Joseph H. Dinh
(74) *Attorney, Agent, or Firm*—Townsend and Townsend and Crew LLP (57) ABSTRACT

A round robin interface multiplexing up to 4 lines of approximately T1 capacity onto a single J2 circuit. The interface may be built on a card that is utilized on existing telecommunications equipment boxes to allow the existing equipment to be used in conjunction with J2 lines in Japan, or on Japan infrastructure lines purchased and used outside of Japan. The interface also de-multiplexes signals from the J2 line to the separate lines of approximately T1 capacity allowing for reception and transmission of the signals.

27 Claims, 10 Drawing Sheets

FIG. 10

METHOD AND APPARATUS FOR A J2 INTERFACE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to telecommunications systems. The present invention is more particularly related to dividing bandwidth of a high speed data line into separate lines provided to individual bandwidth subscribers. The invention is also more particularly related to providing an interface to a J2 line that divides the J2 bandwidth into multiple lower bandwidth data lines provided to subscribers, and dividing a J2 line into multiple T1 lines. The invention is also more specifically related to providing an interface that allows existing U.S. based telecommunications equipment to provide the lower bandwidth services to customers, based on an interface to the high speed J2 line.

2. Discussion of Background

In the United States telecommunications system, information is routed over lines of various speeds. For example, a POTs line is typically a 64k line and carries voice and/or other forms of data (all collectively referred to as data, or subscriber communications) between individual subscriber telephones and DTE's (Data Terminal Equipment, fax, for example). The data sent over the 64k circuit is then routed via a network to a destination (destination subscriber), where the data is received and/or transmitted.

These 64k lines transport the subscriber's data and signaling needed to direct the data sent (call set-up, etc.). However, when routed over the network, the data is typically multiplexed onto higher bandwidth trunk lines which are shared between multiple other subscriber's communications. For example, referring to FIG. 1, 64k lines 100 are typically Time Division Multiplexed (TDM) onto T1 lines, which carry 24 64k lines for a total bandwidth of 24×64k (1.544 Mb) per T1 line.

Figure 1:
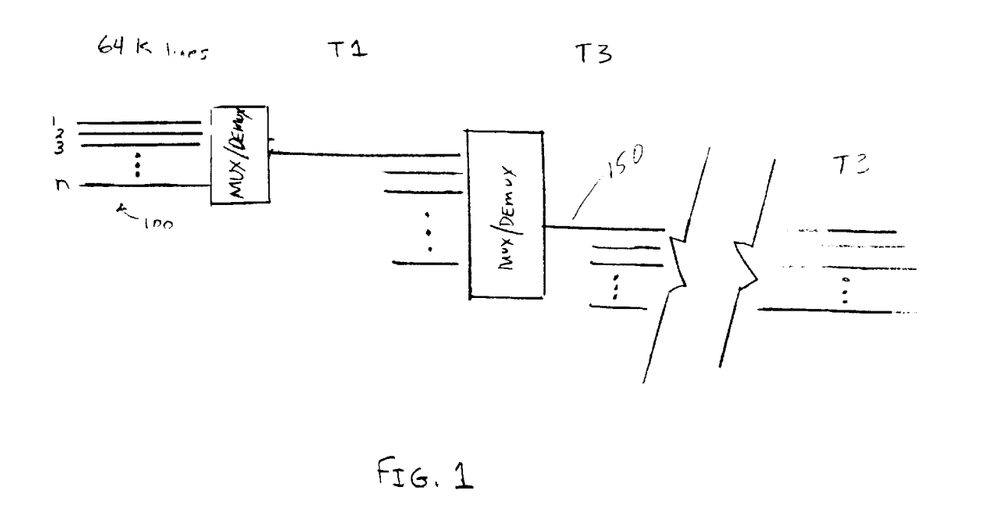
FIG. 1 is an example of multiplexing lower bandwidth lines onto high speed trunk lines.

As data is sent further into the network, additional multiplexing onto yet higher bandwidth lines is typically performed. For example, multiple T1 lines can be multiplexed onto a T3 line 150 which has a capacity of up to 28 T1 lines for a total bandwidth of 28×24×64k. In other systems, various capacity lines may be multiplexed together and share large bandwidth circuits and be transported through the network.

Thus, trunk lines of even higher capacity may multiplex any number or combination of less than 64k, 64k, T1, T3, etc, for data transport between the various nodes in the network. As the data travels closer to it's destination, it is also de-multiplexed, either in steps (T3→T1→64k, for example), or de-multiplexed in larger steps, depending on the implementation or exact network configuration.

These same principles may be applied to private and corporate networks that stand alone or operate in conjunction with the U.S. telecommunications system. A variety of equipment is available for performing the multiplexing, de-multiplexing, and needed signaling for transporting the data through the network.

Figure 2:
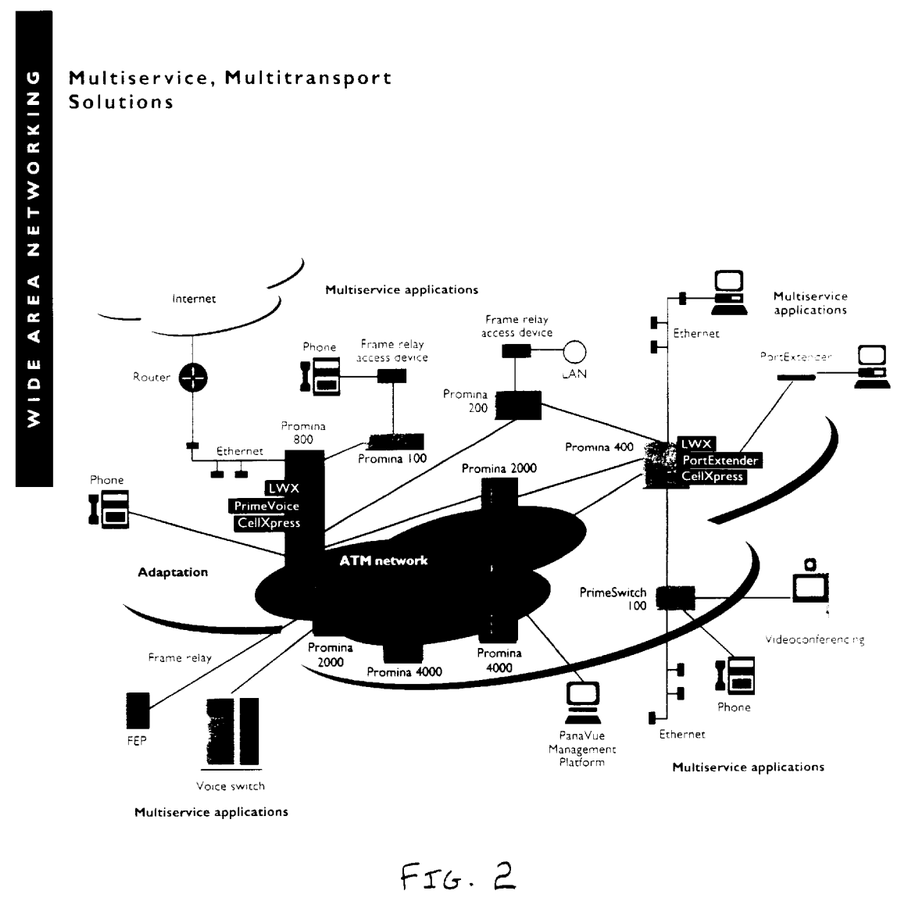
FIG. 2 is a block diagram of various telecommunication devices that hosts plural multi-service applications, and general communications capabilities.

One equipment example, see FIG. 2, is the Promina line of multi-service, multi-transport solutions available through Net.com. The Promina line of solutions includes the Promina 800 series that provides carrier class WAN equipment and services ideal for private and carriers of telecommunication services. Such services include:

- consolidation of diverse traffic and applications on a single platform;
- delivering cost-efficient, reliable access to multiple services;
- supply access to WAN services and applications ranging from carrier network applications to private network applications;
- sites ranging from central offices, corporate facilities, and/or small branch offices;
- creating VPN's that interwork applications used by widely disperate clients;
- mission critical availability;
- technology independence by supplying appropriate technology when needed;
- provides single platform delivery of ATM, advanced bandwidth management, ISDN, multi-protocol routing and bridging, voice processing, frame relay, and digital data networking; and
- provides safeguards for end-to-end connections with distributed intelligence that prevents single points of failure.

Equipment such as the Promina 800 series is ideal for use in carrier networks for multiplexing, routing, and transporting multiservice traffic over the available, and different access lines (T1, T3, etc.) used in the world's telecommunications infrastructure.

U.S. Telcos offer a variety of services to subscriber's, including less than 64k, 64k, T1, T3, and other bandwidth lines that may be installed at a subscriber's site, or leased as needed by the subscribers. Using a device like the Promina 800 series, a Telco can offer services at any of the standard and/or customized throughput rates by partitioning any part of a higher bandwidth line and providing it to a subscriber. Typically, a subscriber will order an amount of bandwidth to cover it's throughput requirements for daily operations. T1 is a popular amount of bandwidth sufficient for the needs of most medium and large sized businesses.

In Japan, the telecommunications infrastructure is based on a set of trunk lines that are different from those in the U.S. For example, high capacity lines available to businesses are the J2 lines. A J2 line consists of a 6.3 Mb line that includes channels for payload, signaling, and timing signals. The J2 line carries considerably more data than a typical T1 which is common for supporting medium and large sized business communications needs, and, as a dedicated line, is also very expensive.

In Japan, currently, J2 is the only practically available line for business or other high speed data connections. One reason few other options are available for business bandwidth requirements is that the telecommunications system in Japan is a regulated monopoly and not open to competition. However, the deregulation process has started in Japan and it is expected that the introduction of competition for new and more flexible services to customers will create high demand for alternate services such as lower speed bandwidth lines to medium and large sized businesses.

Another reason that the J2 is currently the only practical bandwidth solution is that their exists an absence of multiservice, multi-transport equipment that is compatible with the J2 standard and will allow the J2 to be divided into high bandwidth lines of moderate capacity compared to the entire capacity of the J2. Therefore large amounts of development are needed to produce equipment capable of providing the new levels of service. Furthermore, other telecommunications infrastructures (countries, private companies, etc.) may also wish to purchase J2 capacity and re-sell the lower bandwidth lines to other customers.

Ideally, the J2 line would utilize already developed equipment such as the Promina 800 series to mux and de-mux the J2 lines and provide the lower bandwidth services to various customers. However, currently available equipment for multi-service applications are not available with trunks interfacing to the J2 standard, therefore the existing base of available equipment is not readily deployed.

SUMMARY OF THE INVENTION

To address the problems faced in the current state of telecommunications infrastructure, the present invention provides an interface between a J2 line to multi-service, lower speed access types transported through T1 or other lines. The lower speed access types allow businesses and other customers to take better advantage of, and more efficiently feed, the J2 line.

Although the invention is mainly directed to a T1/J2 interface, in it's broadest sense, the invention, as described herein, may be practiced to any of different systems, providing an interface between any high speed and plural other lower speed trunk lines (J2 to E1 lines, for example). The interface allows any existing equipment compatible with the trunk lines being interfaced to provide services (E1 based series, for example) to customers.

The invention includes a round robin interface that sequentially selects portions of available J2 bandwidth and interjects data transmitted from the lower or alternate bandwidth lines (from one or more subscribers) onto the J2 line. Incoming data transmitted to each subscriber and multiplexed onto the J2 line are retrieved in round robin fashion and transmitted to the intended subscriber. In one embodiment, the lower bandwidth lines are T1 lines (or other lines of approximately T1 capacity) connected to individual subscribers or a single subscriber connected to plural multi-service applications. In a preferred embodiment, the interface is developed as a device attached to an existing multi-service, multi-transport access platform.

The invention may be embodied as a device, a J2 interface, comprising a set of connectors, each connector configured to secure a telecommunications line to the interface, a J2 connector configured to attach a J2 line to said interface, a signaling and timing device configured to produce J2 formatted signals and timing (ST) according to J2 standards, and a multiplexor attached to each of said telecommunications lines and said signaling and timing device, said multiplexor configured to select sets of data from each of said set of connectors and ST data related to the selected sets of data from said signaling device and place each set of data and ST data on the J2 connector.

The invention also includes a J2 interface, comprising a telecom connecting means for connecting plural telecommunications lines to the interface, a J2 connecting means for connecting a J2 line to said interface, a signaling and timing means for producing J2 formatted signals and timing (ST) according to J2 standards; and a multiplexing means for multiplexing each of said telecommunications lines and said produced J2 formatted ST onto said J2 connecting means, said multiplexing means including, means for selecting sets of data from each of said telecommunications lines and ST data related to the selected sets of data, and means for placing each set of data and ST data on the J2 connecting means.

The invention may also be embodied as a method of interfacing a J2 line to existing telecommunications equipment, comprising the steps of receiving signals from plural telecommunications lines, selecting sets of data from each of said plural telecommunications lines, generating signaling and timing (ST) as required by J2 standards for the selected sets of data, and placing electro-optical signals representing each of the selected sets of data and the generated signaling and timing (ST) on a J2 line.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

With the pending deregulation of Japan's telecommunications industry (currently NTT), many telco's will want to get into the business of what is known as a Local Exchange Carrier (LEC). LECs provide telecommunication services over high speed lines brought to the office or in some cases home subscribers. One problem in providing LEC services in Japan is that the current industry is based on a J2 line, a 6.3 Mb line, that no current equipment vendors provide equipment capable of multiservice applications compatible with the current Japanese infrastructure (J2).

However, much equipment is available to support multi-service applications for other telecommunications infrastructures (U.S., or Europe, for example). In the U.S., telecommunications are based on sub 64k, or a single 64k line (generally, 64k bandwidth). When higher bandwidths are needed, high speed lines are provided at multiples of the 64k lines. For example, a T1 line has bandwidth matching 24 64k lines, for a total of 24×64k=1.544 Mb. The T1 line is Time Division Multiplexed (TDM). Service can also be provided at any range (1–24) or N×64.

In Europe, a similar 64k circuit is the base standard, and higher bandwidths start with an E1 line that equals 32 of the European 64k lines for a total bandwidth of 32×64k=2.048 Mb. Again, services at any multiple of the base bandwidth may also be provided.

The J2 line is a 6.3 Mb line, which is much more than most business require. In addition, because it was developed many years ago, and that the infrastructure in Japan has not been developed (mainly due to regulation), that the J2 standard is not well understood. Thus, many equipment manufacturers look at a 6.3 Mb line, and they are not familiar with how to interface new services to that size of line.

However, the present inventors have realized that the J2 can be broken down into components having multiples of a base standard. Generally speaking, the standard J2 has 96 DSO's, plus timing and signaling, as shown in Table 1.

TABLE 1

| DS01 | |
|---|---|
| DS02 | |
| DS03 | |
| . | |
| . | |
| . | → 6.3 Mb |
| DS096 | |
| T, S & F | |

Still further, the present inventors have realized that the J2 line can also be broken down into a base bandwidth roughly equivalent to the bandwidth of U.S./European systems, plus some additional bandwidth to carry signaling and timing. The present inventors have determined that the J2 adheres to the following formula:

$$J2 = 96 \times 64k + ST + F$$
$$= 24 \times 64k \times 4 + ST + F$$
$$= 4 \times T1 + ST + F$$
$$= 6.3\ Mb,$$

and is illustrated in Table 2.

TABLE 2

| 24×DS0 | |
|---|---|
| 24×DS0 | |
| 24×DS0 | |
| 24×DS0 | → 6.3 Mb |
| T & S | |

Therefore, the J2 can be viewed as four 24×64k lines, plus signaling, timing, and framing. The four 24×64k lines are each equivalent in bandwidth to the common Ti line used in the U.S. Therefore, the present inventors determined that with an appropriate interface capable of converting J2 to four separate T1 lines would allow the use of existing U.S. telecommunications equipment for multi-service applications to be used in Japan after deregulation.

Figure 3:
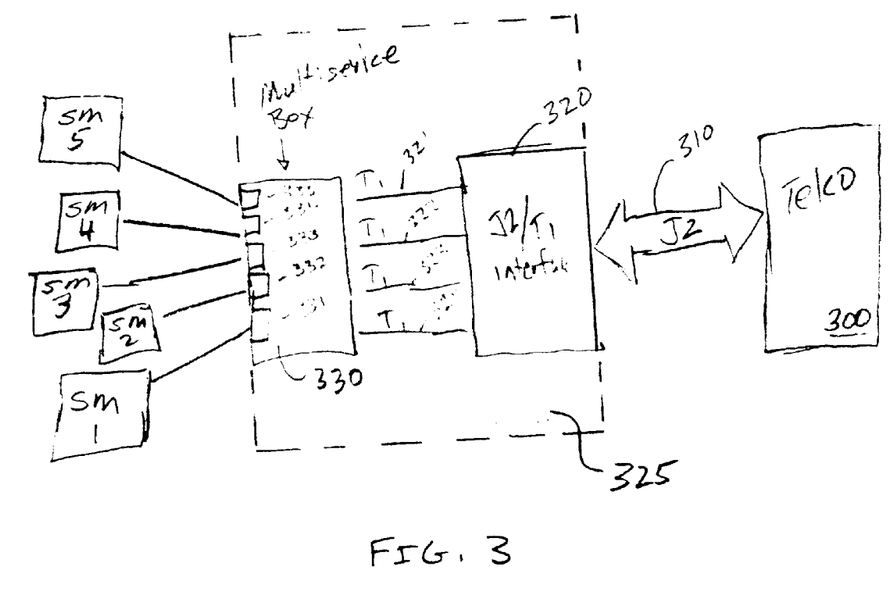
FIG. 3 is a block diagram of a basic J2/T1 interface according to the present invention.

Referring again to the drawings, wherein like reference numerals designate identical or corresponding parts, and more particularly to FIG. 3 thereof, there is illustrated a high level block diagram of the present invention. A Telco 300 (NTT, for example), is shown providing a J2 line 310 to a J2/T1 interface 320. The J2 line is the Japan standard 6.3 Mb line, and the J2/T1 interface 320 and multi-service box 330 are equipment installed at a Telco customer site. In this example, the Telco customer is any business or other entity that requires network services and the equipment is collectively referred to as Customer Premise Equipment (CPE) (a Promina Series device, for example).

The multi-service box 330 is a standard piece of U.S. infrastructure compatible equipment. It is fed by the J2/T1 interface 320. From the customer side, the J2/T1 interface 320 takes T1 signals from the T1 lines 321 . . . 324, adds the signaling and timing required by the J2 format, and places each of them at the appropriate timing intervals on the J2 line. From the Telco side, the J2/T1 interface takes signals off the J2 line, removing the J2 signaling and timing, and formats each group of 24×64 signals onto the separate T1 lines.

The separate T1 lines are then the basis for providing multiple services at the customer site. Each of front cards 331 . . . 335 (in this example) are supported by the T1 lines and provide telecommunication services to an end user. Service Modules Sm1 thorough SM5 represent devices for end user implementation of any of the broad class of telecommunications services including any of voice, data, video, teleconferencing, Internet access, etc.

Although FIG. 3 has been described as using a specific J2/T1 interface 320 and T1 lines 321 . . . 324, the use of T1 lines is shown as representative of the capacity of the J2 line (approximately 4 T1's). However, any 4 lines of approximately T1 capacity will efficiently utilize the J2 capacity. Therefore, T1 formatting is not required in order to utilize the broader concepts of the present invention. For example, a custom line of approximately T1 capacity, or data content equivalent to that carried on a T1 line plus proprietary signaling and timing may also be applied in alternate embodiments of the present invention. It is intended throughout this section that discussion regarding the present invention and T1 lines may also be applied to lines of other formats, whether or not those other formatted lines are specifically discussed.

The Promina line of multi-service, multi-transport solutions available through Net.com, as discussed above, is an ideal selection for implementing the J2/T1 interface 320 and multi-service box 330 (dotted box 325). The Promina line of solutions includes the Promina 800 series devices that provide carrier class WAN equipment and services ideal for private and carriers of telecommunication services. The Promina line (Promina series devices) are also ideal for any of the non-T1 implementations or embodiments discussed above.

Although the present invention described herein is mainly directed toward allowing equipment compatible with U.S. infrastructure to be used on J2 lines (Promina 800, for example), the invention may also be applied so as to interface equipment of other infrastructures (Europe, for example). The main differences between a U.S. based infrastructure interface and a European based infrastructure interface being how the signals are divided to/from the J2 and from/to the infrastructure standard line.

Figure 4:
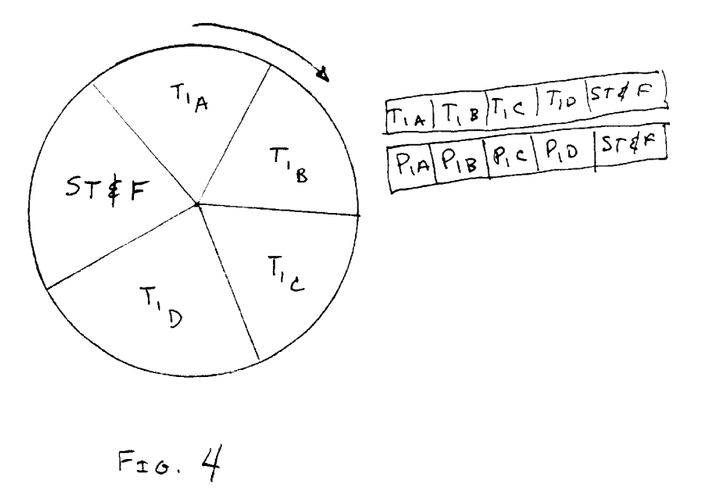
FIG. 4 is a diagram illustrating bandwidth allocations on a J2 line according to the present invention.

The present inventors have determined that a round robin interface between the T1 (or other) lines 321 . . . 324 provides an efficient method for converting the T1 formatted lines to J2. FIG. 4 illustrates an example of the timing and bandwidth allocation on the J2 line. The J2 line is TDM, and the round robin interface provides data onto the J2 in the appropriate order of T1 321, T1 322, T1, 323, T1 324, and ST and F (signaling, timing, and framing) into each in a specified respective timing interval locations of the J2 TDM per the J2 standard. The signal and timing and the framing are also muxed at the appropriate point.

Muxing is performed at the appropriate point following the J2 standard. The J2 standard includes a data segment, signaling and timing segment, and a framing segment. At a high level, the J2 format is shown as data, ST & F as illustrated in Table 3:

TABLE 3

| <———— data ————> | <— ST —> | F |

Thus, all the T1 data (which includes the T1 signaling, timing and framing) is multiplexed into the data segment of the J2 format. The data segment is itself broken down into time slots (or sets of bits or bytes) in which the T1 data (including T1 ST & F) is multiplexed. The J2 ST & F segments are added as required by the J2 format for the data being transported (ie, any frame sync bits, bit error, or other ST & F functions required by the J2 format).

Data transported on the J2 line and then de-multiplexed onto individual T1 lines undergoes the reverse process, all J2 formatted ST & F is stripped off and the T1 data contained in the J2 data segments (T1 data and T1 ST&F) are placed on the appropriate T1 line. The appropriate T1 line is identified by a particular time slot within the J2 data segment (i.e., each T1 line is assigned a particular time slot (set of bit positions) within the J2 data segment.

The process is basically a round robin mux, taking a slice of bandwidth from each of the T1 lines and placing that slice in a time slot along with a corresponding set of signaling and timing. The multiplexing may be performed in a different order than what is described herein, but the data slices for a particular T1 line will occupy a same corresponding time slot (every 2nd slot from a set of 5, for example) during each TDM time slot set.

In one embodiment, the data slices from each T1 line are one byte. Alternative embodiments may have any amount of bytes or bits as the size of the data slice. Again, as discussed above, the exact formatting of the lines being round robin multiplexed to the J2 may be T1 or any custom/proprietary format. It is important that the payload capacity of the lines be close to T1 payload capacity so that the J2 line has a few, if any, empty time slots.

Figure 5:
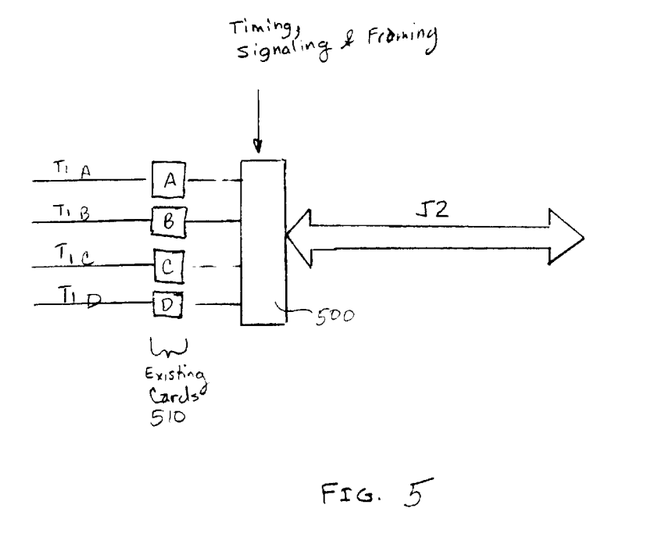
FIG. 5 is a block diagram of existing cards and a J2 interface according to one embodiment of the present invention.

FIG. 5 is a block diagram of an example implementation of a round robin mux embodiment of the present invention The round robin mux may be implemented on a programmable device (FPGA 500, for example). In alternative embodiments, other electronic devices (ASIC, VLSI, for example) or software may be implemented to perform the same functions. On the T1 side, the T1 lines A–D feed and accept data to/from each of the existing cards 510A . . . 510D. The FPGA 500 accepts T1 signals from each of existing T1 cards 510A–510D. The data from the existing T1 cards, TRK-3, for example, (or cards serving data at approximately a T1 rate) is accepted in an order such as from 510A, then 510B, 510C and so forth, for example. (Note: up to 4 T1s are multiplexed. 1, 2, or 3 T1s may also be placed on the J2.) After accepting data from the existing T1 cards, signaling and timing related to the T1 signals (now groups of 24×64k data on the J2 line) are also placed on the J2 line. The process is repeated round robin. In one embodiment, the T1 data and the timing & signaling are maintained in a buffer and then released onto the J2 line before the process is repeated.

Thus, the FPGA 500 multiplexes 4 T1 (or other) lines and signaling/timing onto the J2 line. Digitally timing and framing (SYNC) of signals and allocating them onto a circuit (the J2 circuit). From the J2 side, the FPGA 500 accepts incoming data and signaling, breaking the incoming data into it's component parts, 4 T1 lines, and distributes each previously TDM multiplexed set of T1 data to a respective one of the existing T1 cards 510.

Figure 6:
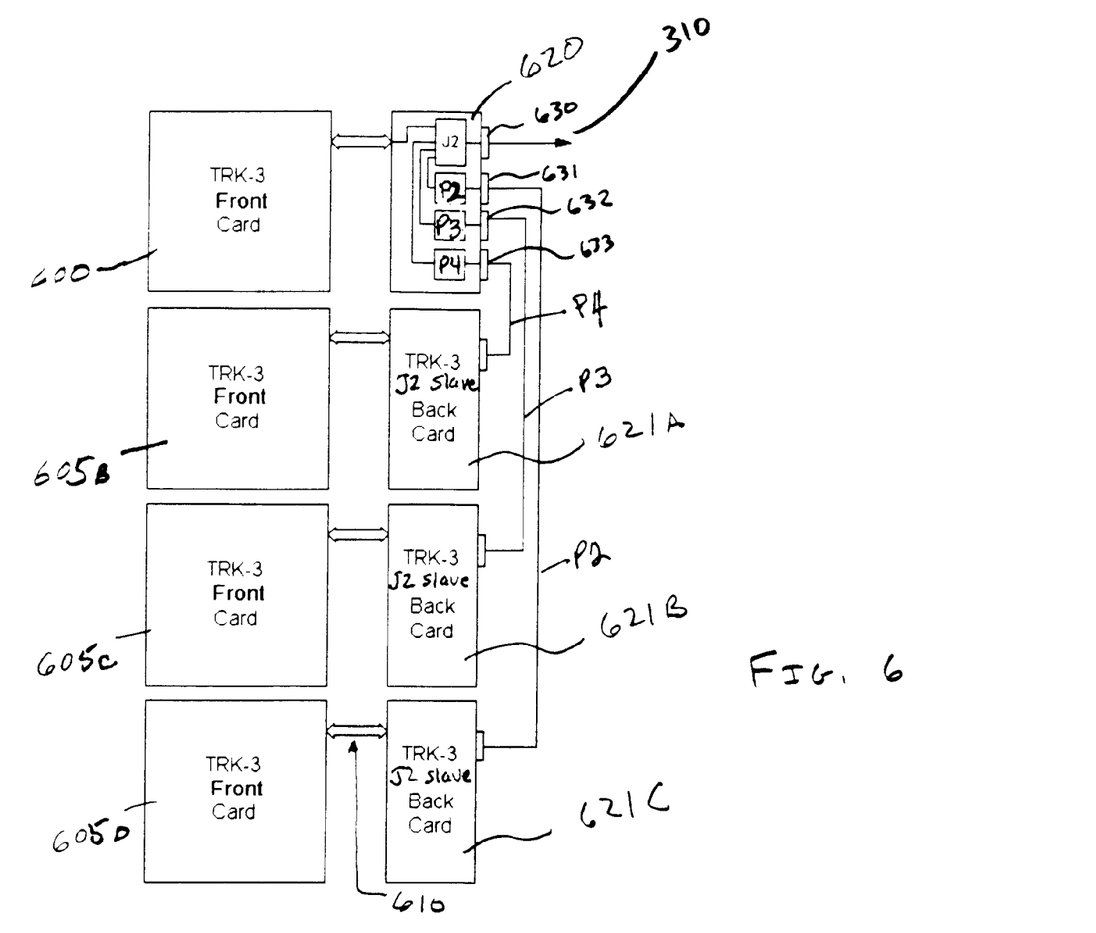
FIG. 6 is a block diagram of a J2 interface card and supporting equipment according to the present invention.

FIG. 6 illustrates a set of cards, including one embodiment of the FPGA 500, shown as part of back card 620 and as part of an existing telecommunications equipment (Promina 800, for example): The existing telecommunications equipment includes a set of TRK-3 Front cards 600A . . . 600D that perform processing required for each of four independent T1 lines. The TRK-3 front cards are connected to a backplane 610 for communicating with a set of corresponding TRK-3 T1 back cards 620, and slave backcards 621A . . . 621C.

With a Promina 800 series device, a typical arrangement includes the front cards, which perform the required processing, and the back cards, which provide an interface and are utilized to send and receive data from connected circuits or lines. However, this represents a division of responsibility or processing among the cards. Other divisions of responsibility in the layout and card functionality could be constructed based on the present disclosure. For example, all functionality of each Front and back card could be built on a single purpose board with multiple interfaces (for the J2, and each T1, for example). The use of front cards, back cards, and a backplane is a division of responsibility that allows for efficient updating and upgrades of equipment without replacing an entire system or chassis. The update/upgradability of this feature is best illustrated in FIG. 6, which utilizes existing cards in addition to upgraded or new back cards for implementing the present invention.

In the arrangement of FIG. 6, back card 620 performs all the T1 (or other formatted communication) multiplexing and ST/F as discussed above. Under normal operating circumstances, the back cards (TRK-3 J2 slave back cards 621B, 621C, and 621D) format T1 data received from the front cards into full T1 frames. However, in the present invention, back cards 621A, 621B, and 621C are conduits that supply the front card processed data from each of three lines to the back card 620.

Although it is preferred that the TRK-3 J2 slave back cards only provide a conduit for T1 data (data processed by TRK-3 front cards at approximately a T1 data rate), formatting, synch, error bits, or other protocols may be applied for communication or other purposes in transferring the T1 data from the back cards 621A, 621B, and 621C to the back card 620. Therefore, the lines are labeled P1, P2, P3, and P4, representing data flow from each back card (and P1, not shown, a direct connection from TRK-3 front card 600 to back card 620), each data flow containing data at T1 or approximately a T1 data rate, plus any additional formatting that may be supplied by the back cards.

Also under normal circumstances, the backplane is utilized for communications between cards, however, in this embodiment of the present invention, utilizing a Promina 800, the communications are provided via interfaces external to the backplane. The external interfaces are any type of connection for a line that carries the signals sent between the back cards 621A, 621B, and 621C and back card 620 (connectors like standard T1 connectors are acceptable). Using the external interfaces, the present invention avoids costly software changes and other problems associated with using the backplane with new boards.

In FIG. 6, the backcard 620 is shown being fed 3 lines from other cards on the same Promina chassis that the backcard 620 is installed. However, lines from any other Promina chassis, or other sources could be fed into the backcard 620 via any of the 3 external interfaces 631, 632, and 633. In other embodiments, a different number of external interfaces are provided (4, for example) to make a standalone box that converts J2 to multiple T1, for example.

Figure 7A:
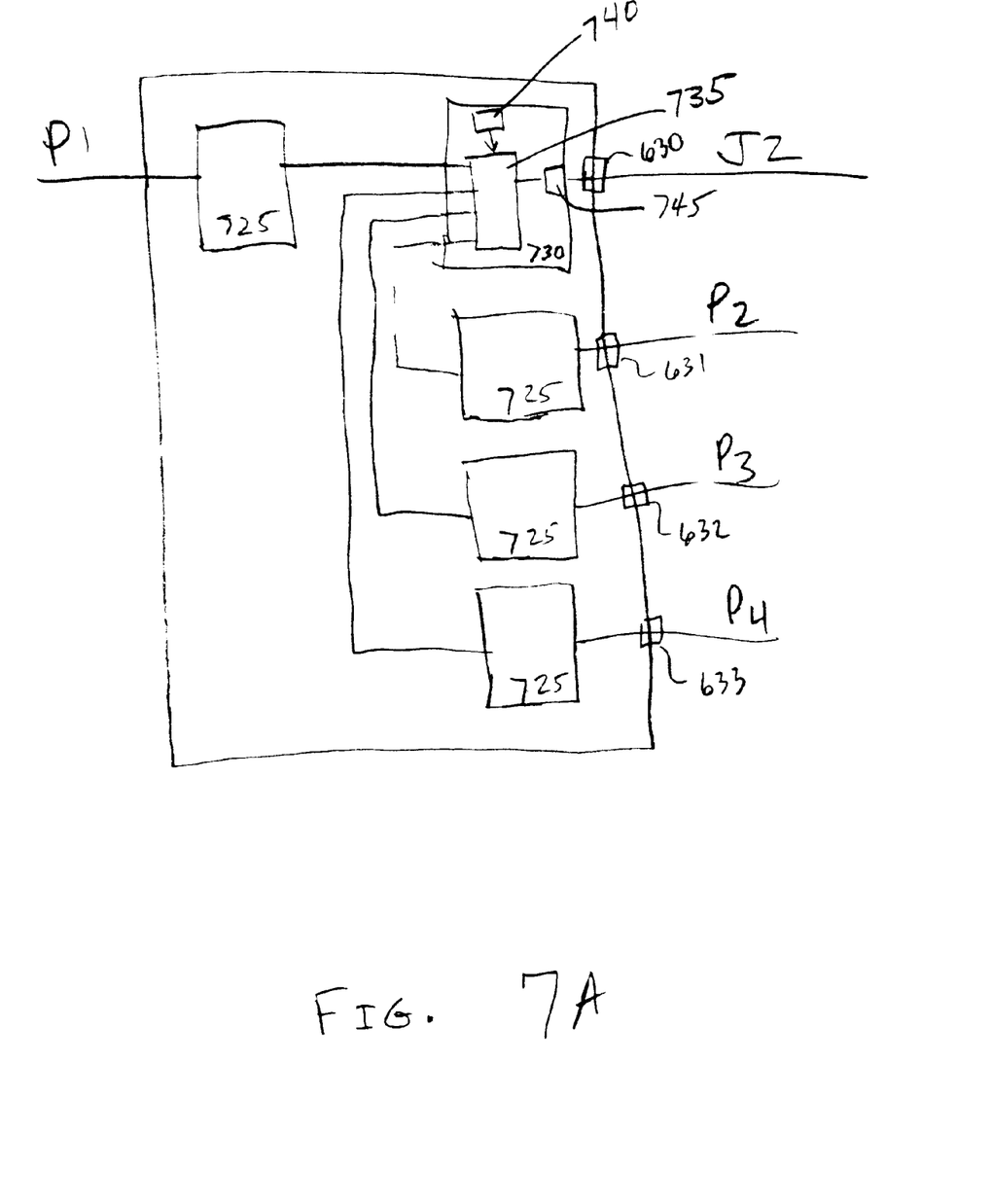
FIG. 7A is a block diagram of an example embodiment of a J2/T1 mux back card according to the present invention.

The back card 620 is a multiple P/J2 interface and includes buffering and logic needed to select slices of each P line processed by 600 and 605A, 605B, and 605C and place the data on the J2 line. FIG. 7A is a block diagram of an example embodiment of the P/J2 interface of back card 620. Each of the 4 P lines include a buffering device 725 for capturing segments of data to be placed on the J2 line or fed back to a corresponding P line. A multiplexing mechanism 730 includes mux/demux 735 that implements a round robin device that sequentially selects a data set from each of the P lines and signaling/timing from signal & timing device 740. The mux/demux takes the selected data sets and signaling and timing and places the data/ST on the J2 line. From the J2, the mux/demux captures each set of P data transmitted over the J2 and distributes that data to the corresponding P line, removing the J2 required signaling and timing.

Since the J2 is an optical line, the P/J2 interface includes an optical capture and signaling device 745 at the J2 end of the interface. The optical capture device reads the light pulses sent at 6.3 Mb rate over the J2line and converts them to electrical signals back through the mux for processing by the Promina front cards and transport through the backplane 610 and TRK-3 J2 slave back cards. The signaling portion performs the reverse task, converting electrical T1 signals into optical pulses at the J2 6.3 Mb rate.

The back card 620 includes all the TRK-3 J2 slave back card features as performed by 621A . . . 621C, but performed for the TRK-3 front card 600 instead of 605B, 605C, and 605D. In addition, all the muxing, injection of signaling and timing, and conversion to pulsating optical electrical light is performed. Since a great deal of electronics is placed on a single board for performing the necessary muxing, etc, on the back card 620, it is expected that additional room from a standard back card may be required. In the Promina 800, enough physical space is provided that two boards containing electronics may be sandwiched together and still fit in the slot for a single card. Thus, if all of the parts required to build the back card 620 cannot be easily fit onto a single board, a double spaced sandwiched board may be utilize to increase floor space for the required electronics. Alternatively, custom integrated chips may combine functionality into a smaller package to save space.

Figure 7B:
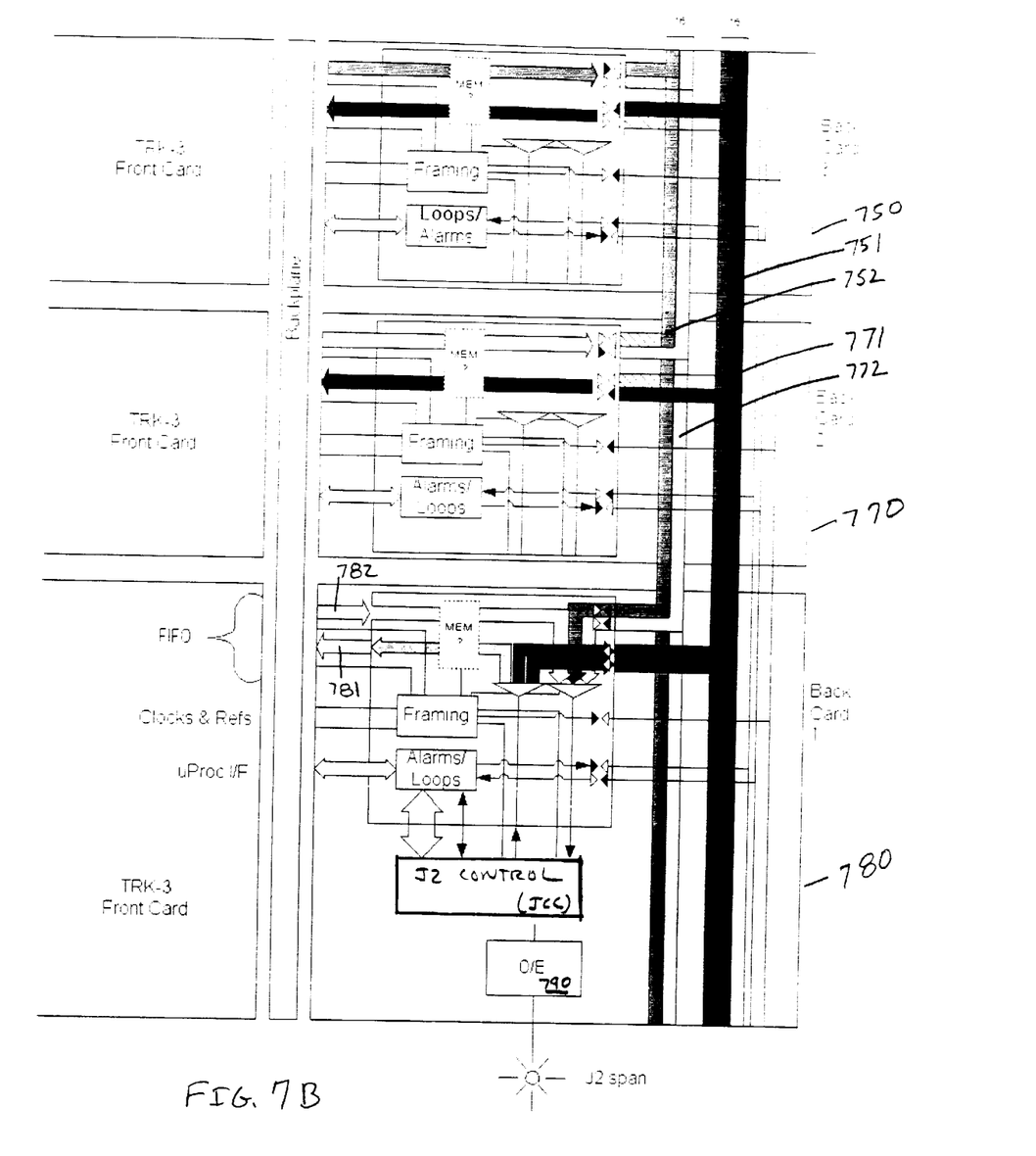
FIG. 7B is a detailed block diagram of another embodiment of the a J2 interface card according to the present invention.

FIG. 7B illustrates a detailed block diagram of a J2 interface card, and flow between cards according to the present invention. In 7B, 2 lower bandwidth back cards 750, 770, and a J2 interface card 780 are illustrated along with internal data flows for each card, and data flow between the cards. The J2 interface card 780 includes direct lower bandwidth connections 781 and 782 with a corresponding front card. The connections 781 and 782 provide one channel that is being multiplexed onto the J2 line. Back cards 750 and 770 have corresponding lines 751 and 771 that provide data to the J2 interface card, and 752, 772, that receive data from the J2 interface card. In addition, each of the cards contain framing and loops/alarm electronics for maintaining the data flows.

The J2 interface card further includes additional signaling and control via a J2 control circuit (JCC) that provides signaling, timing and traffic control of data placed on the J2 line. The J2 interface card includes an opto or electrical (opto-electrical) device 790 that actually places and receives signals (either optical-light or electrical, e.g., an optical laser or electrical transceiver) on the J2 line.

Figure 8:
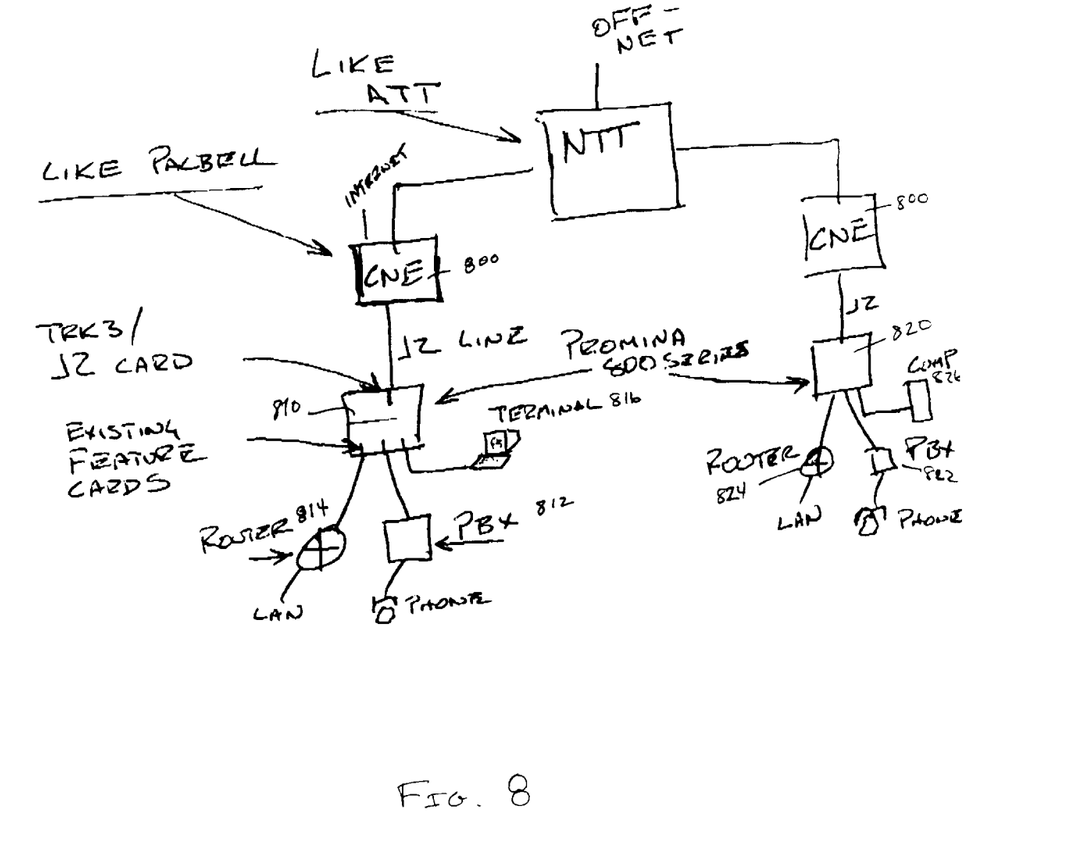
FIG. 8 is a block diagram of telecommunications equipment deployed in a configuration that takes advantage of the present invention.
Figure 9:
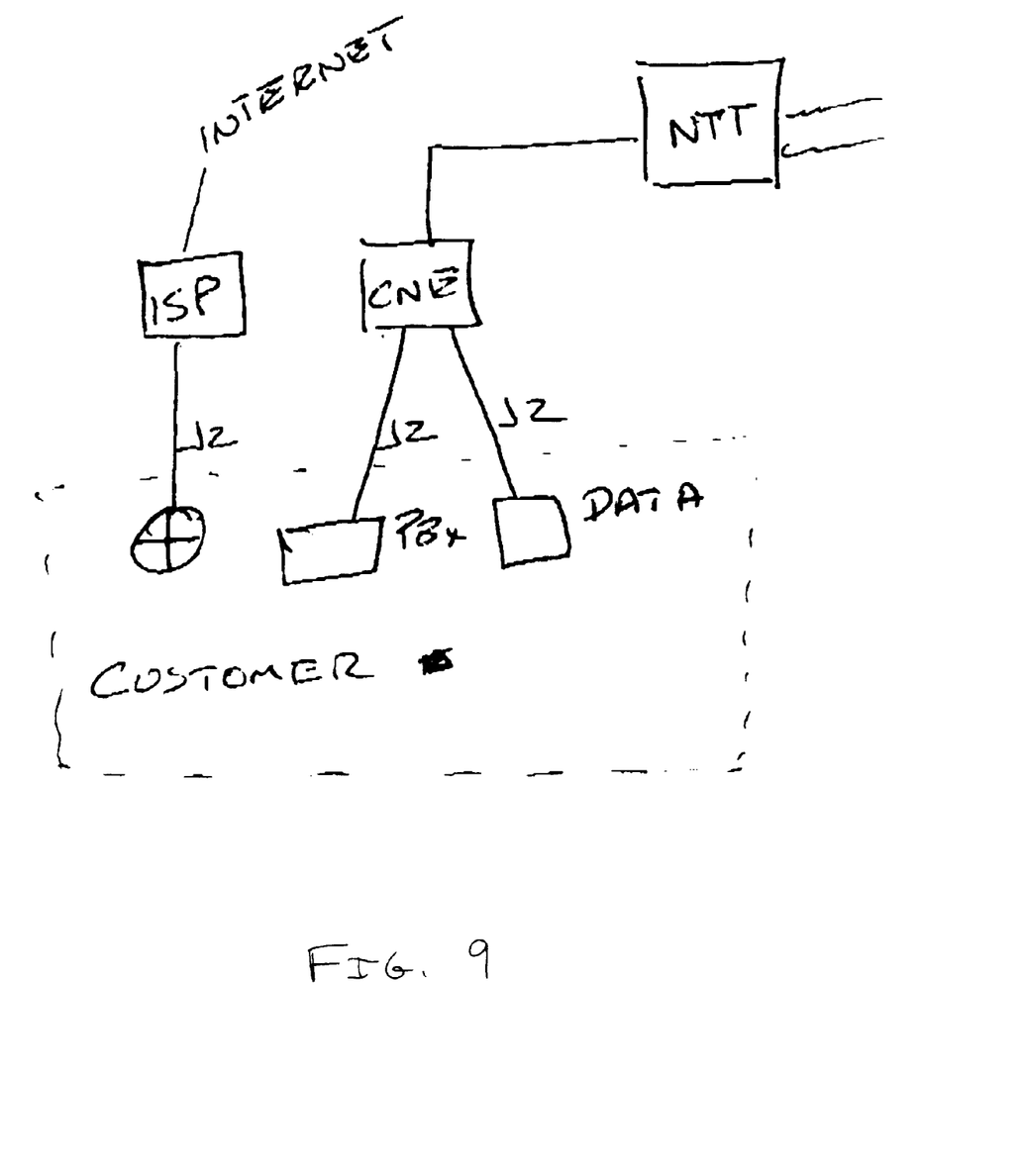
FIG. 9 is an example of separate J2 lines needed for different services.

FIG. 8 is a block diagram of telecommunications equipment deployed in a configuration that takes advantage of the present invention. A CNE 800 provides a J2 line to a customer. CPE 810, 820 receives the J2 line and multiplexes multiple lower bandwidth lines to the J2. Any number of services are then provided of f of the J2 on the individual lower bandwidth lines (PBX 812, 822 Router/LAN 814, 824, terminal 816, computer 826, for example). Allowing the customer to have multiple services off a single J2 line. FIG. 9 is an example of separate J2 lines needed for different services without the present invention.

Figure 10:
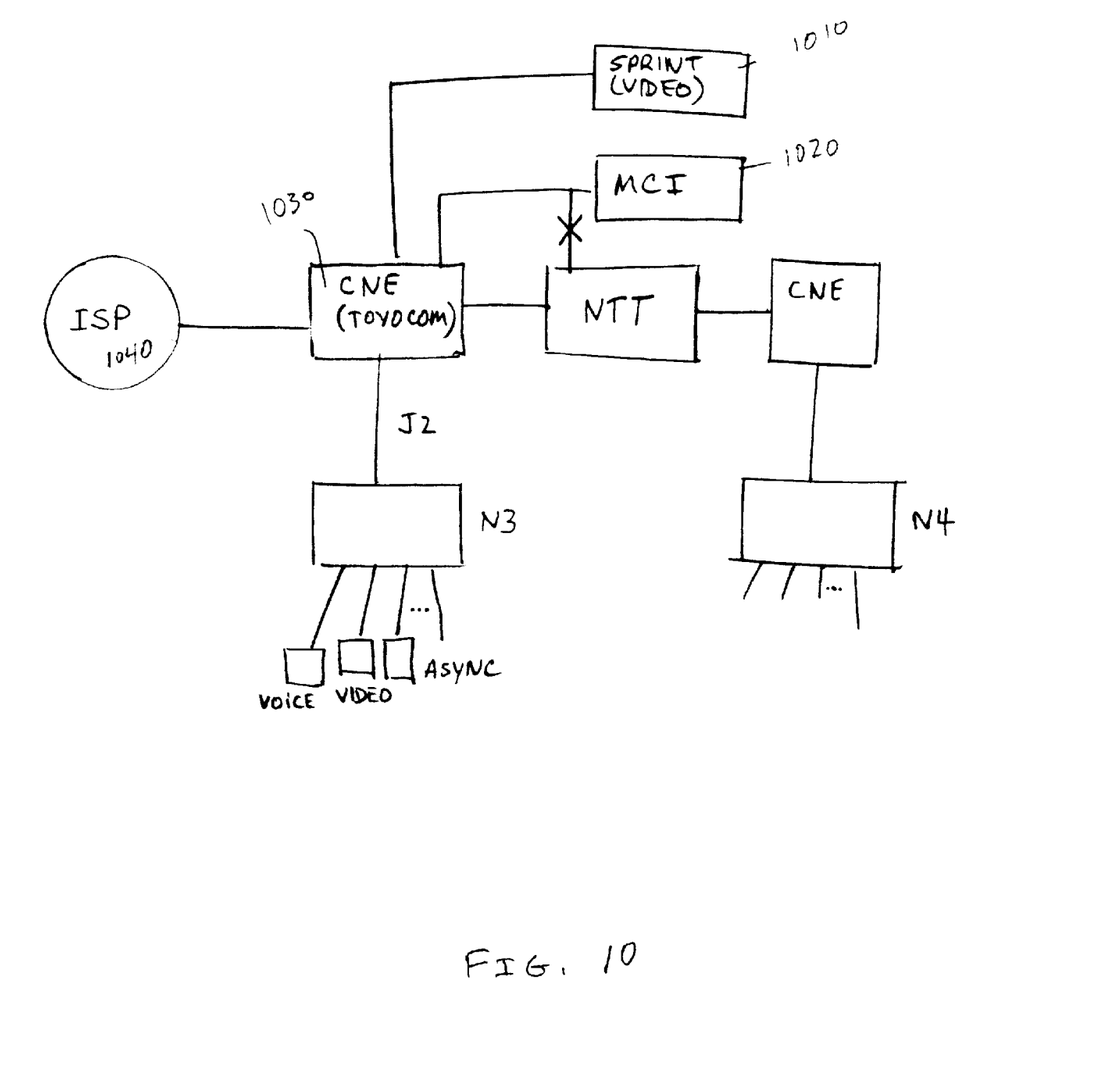
FIG. 10 is an example of Telco and second party connections made according to an embodiment of the present invention.

FIG. 10 is an example of Telco and second party connections made according to one embodiment of the present invention. Many different economic opportunities for making connections with the present invention are possible. For example, in FIG. 10, long distance carriers, video carriers, etc, such as MCI 1020 and Sprint 1010 are typically connected with NTT. NTT then was able to charge either MCI/Sprint for making connections or the customers making the connections. However, after deregulation, it is envisioned that a CNE would be able to make its own connections to MCI 1020, Sprint 1010, or other carriers, breaking the monopoly now held by NTT in Japan. The use of standardized equipment such as the Promina 800 series will make such connections easy to implement.

FIG. 10 illustrates that the link between NTT and the carriers is broken, and these links now being provided via CNE's (CNE 1030, for example, operated by Toyocom). In addition, ISP's (ISP 1040, for example) would be provided bandwidth to customer sites via the CNE 1030. The CNE can switch/route the 64k off to designated service provider or back to NTT. The CNE would then provide high a speed J2 line to a customer or another intermediary site N3, which would divide the J2 into various constituent lines and services (video, voice, asynch, for example).

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMs, microdrive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, identification and routing of data flows, chassis level control and/or switching of T1 lines or other trunk lines, and the display, storage, or communication of results or statuses according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A J2 interface, comprising:
    a set of connectors, each connector configured to secure a telecommunications line to the interface;
    a J2 connector configured to attach a J2 line to said interface;
    a signaling and timing device configured to produce J2 formatted signals and timing (ST) according to J2 standards;
    a multiplexor attached to each of said telecommunications lines and said timing and signaling device, said multiplexor configured to select sets of services from each of said set of connectors and ST data related to the selected sets of services from said signaling device and place each set of services and ST data on the J2 connector.

2. The J2 interface according to claim 1, wherein said multiplexor is further configured to receive signals from said J2 connector and de-multiplex the received signals to each of said set of connectors.

3. The J2 interface according to claim 1, wherein said set of connectors is a set of T1 like connectors, and said multiplexor is further configured to receive signals for multiplexing from said set of connectors, and distribute de-multiplexed signals to said set of connectors, said reception and distribution across each connector is a T1 data rate.

4. The J2 interface according to claim 1, wherein said multiplexor is a "round robin" type of multiplexor.

5. The J2 interface according to claim 4, wherein the round robin multiplexor sequentially selects data from each connector of said set of connectors and said ST device, and places the selected data and ST data on the J2 connector.

6. The J2 interface according to claim 5, wherein said data selected from each connector comprises one byte of data.

7. The J2 interface according to claim 1, wherein said J2 connector includes an optical recognition and signaling device configured to place electro-optical pulses on the J2 connector, and read electro-optical pulses transmitted to the a J2 connector.

8. The J2 interface according to claim 1, wherein said interface is packaged on a card fitting a Promina 800 back card slot.

9. The J2 interface according to claim 1, wherein said set of connectors includes channel electronics for transmitting a P line directly to the J2 interface, and a set of P connectors that provide attach points for 3 more P lines.

10. The J2 interface according to claim 9, wherein said P line is a line carrying payload data and any associated overhead at a T1 data rate.

11. The J2 interface according to claim 8, wherein each of said channel electronics are maintained on a separate board from said J2 interface, and said separate board and board containing said J2 interface are sandwiched together such that both boards fit into a single card slot of a telecommunications device rack.

12. The J2 interface according to claim 11, wherein said telecommunications device rack is one of the Promina line of multi-service devices.

13. The J2 interface according to claim 1, wherein said services include at least one of data, voice, and video.

14. A method of interfacing a J2 line to existing telecommunications equipment, comprising the steps of:
    receiving signals from multi-service telecommunications lines;
    selecting sets of services from each of said multi-service telecommunications lines;
    generating signaling and timing (ST) as required by J2 standards for the selected sets of services; and
    placing electro-optical signals representing each of the selected sets of services and the generated signaling and timing ST on a J2 line.

15. The method according to claim 14, wherein said step of placing electro-optical signals includes the step of:
    multiplexing each of the selected sets of services and said ST on said J2 line in a round robin fashion.

16. The method according to claim 15, wherein said step of multiplying comprises the steps of:
    (1) placing data from a first of said telecommunications lines on said J2 line;
    (2) placing data from a second of said telecommunications lines on said J2 line;
    (3) placing data from a third of said telecommunications lines on said J2 line;
    (4) placing data from a fourth of said telecommunications lines on said J2 line;
    (5) placing said ST data corresponding to each of said first, second, third, and fourth said telecommunications lines on said J2 line; and
    repeating said steps of (1), (2), (3), (4), and (5) at a rate compatible with J2 standards.

17. The method according to claim 16, wherein said first, second, third, and fourth telecommunications lines are P lines carrying payload data and any associated overhead at a T1 data rate.

18. A J2 interface, comprising:
    a telecom connecting means for connecting plural telecommunications lines to the interface;
    a J2 connecting means for connecting a J2 line to said interface;
    a signaling and timing means for producing J2 formatted signals and timing (ST) and necessary framing according to J2 standards; and a multiplexing means for multiplexing each of said telecommunications lines and said produced J2 formatted ST onto said J2 connecting means;

said multiplexing means including,
means for selecting sets of data from each of said telecommunications lines and ST data related to the selected sets of data, and
means for placing each set of data and ST data on the J2 connecting means.

19. The J2 interface according to claim 18, wherein said multiplexing means further includes:
reception means for receiving signals from said J2 connector;
and de-multiplexing means for demuxing the received signals to each of said telcom connecting means.

20. The J2 interface according to claim 18, wherein said telcom connecting means comprises a set of P connectors, and said multiplexing means further includes means for each of
1) receiving P signals for multiplexing from each of said P connectors, and
2) distributing de-multiplexed P signals to said set of P connectors.

21. The J2 interface according to claim 18, wherein said multiplexing means is a round robin multiplexor.

22. The J2 interface according to claim 21, wherein said round robin multiplexor includes,
means for sequentially selecting data from each of 1) said plural telecommunications lines, and 2) portions of said ST related to the data selected from said telecommunications lines, and
means for placing the selected data and ST portions on the J2 connecting means.

23. The J2 interface according to claim 18, wherein said J2 connecting means includes means for optical recognition and signaling for placing electro-optical pulses on a J2 line, and means for reading electro-optical pulses transmitted across a J2 line.

24. The J2 interface according to claim 18, wherein said interface is packaged on a card fitting a Promina 800 back card slot.

25. The J2 interface according to claim 18, wherein said telcom connecting means includes means for transmitting at least one P line directly to said interface, and
means for connecting a set of three P lines to said interface.

26. The J2 interface according to claim 25, wherein said means for transmitting is maintained on a separate board from other portions of said J2 interface, and said separate board and board containing said other portions of said J2 interface are sandwiched together such that both boards fit into a single card slot of a telecommunications device rack.

27. The J2 interface according to claim 26, wherein said telecommunications device rack is one of the Promina line of multi-service devices.

* * * * *